Sept. 30, 1969     A. M. GASPARI     3,469,488
STENCILLING DIE
Filed July 22, 1968
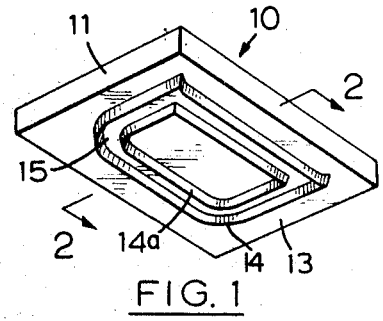
FIG. 1
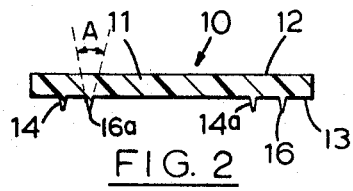
FIG. 2
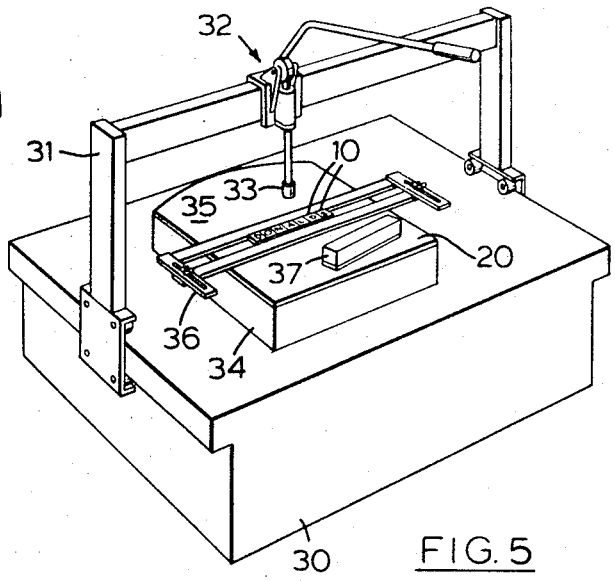
FIG. 5
FIG. 3
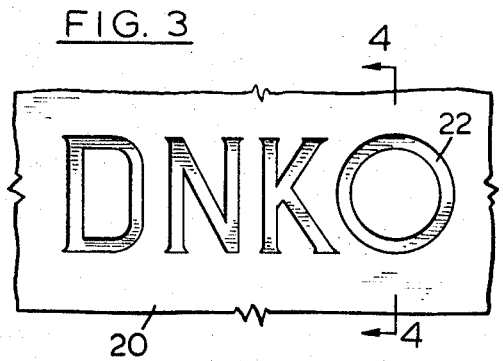
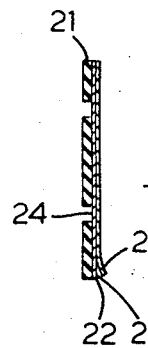
FIG. 4
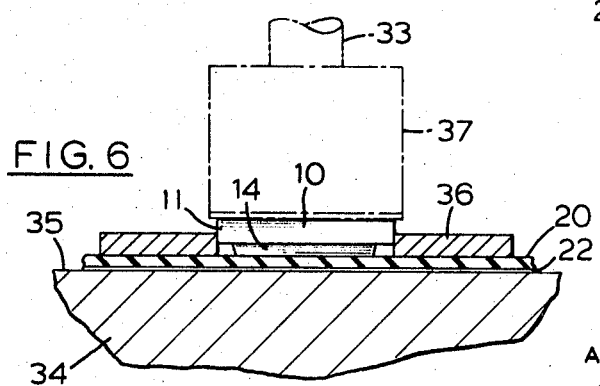
FIG. 6
INVENTOR
ANTHONY M. GASPARI
BY *Westell & Hanley*

United States Patent Office 3,469,488
Patented Sept. 30, 1969

3,469,488
STENCILLING DIE
Anthony M. Gaspari, 3181 8th Ave., Chomedy,
Montreal, Quebec, Canada
Continuation-in-part of application Ser. No. 649,496,
June 28, 1967. This application July 22, 1968, Ser.
No. 752,115
Int. Cl. B26d 3/08; B26f 1/14
U.S. Cl. 83—652                7 Claims

ABSTRACT OF THE DISCLOSURE

This invention relates to a die for cutting indicia through soft, abrasion-resistant material, especially that having a harder plastic film backing sheet which is not intended to be cut. The die is sufficiently stiff and hard to cut through the soft, abrasion-resistant material, but not so hard or stiff as to readily cut through the harder plastic film backing sheet.

The invention also relates to a process for using such die to cut out stencils from such soft, abrasion-resistant material having a hard backing sheet.

---

This application is a continuation-in-part of application Ser. No. 649,496 filed June 28, 1967, now abandoned.

The present invention relates to a die for cutting indicia through soft, abrasion-resistant material and more particularly to a die for use in cutting a stencil for inscribing the surface of hard objects, such as the surface of stone, by sandblasting. This invention also relates to a process for cutting such stencils.

The most efficient and rapid method for marking a design on a stone surface is by sandblasting through an abrasion-resistant stencil which is applied against the stone surface. The stencil protects the portion of the stone that it covers from the abrasive action of the sandblasted particles, while defining a zone corresponding to the indicia cut in the stencil where the blast can cut the design or lettering into the stone. One example of an especially useful stencil is described in Canadian Patent No. 757,807. This stencil comprises a soft abrasion-resistant mask, in which indicia can readily be cut by a die, laminated to a harder flexible backing sheet which is to be cut by a die, but is destroyed by sandblasting. Generally, in cutting this stencil, the die cuts through the soft abrasion-resistant mask but not through the harder backing material. However, the problem is that a hard sharp metal die can easily cut the backing sheet, if too much pressure is exerted on the die.

Alternatively, the stencil can be formed from a soft rubber sheet, which is cut out directly on the stone surface to be sandblasted. In this case, there is no backing sheet, and the die after passing through the stencil can strike the stone surface. Metal dies can scratch or otherwise mar the stone surface, and further can be blunted and chipped when they strike the stone.

It has now been found that a plastic stencil-cutting die, especially useful for cutting a two-ply stencil comprising a soft elastomeric top sheet and a harder, flexible, non-elastomeric plastic backing sheet can be prepared having cutting edges formed of a stiff, resilient, organic polymeric nonelastomeric plastic or hard rubber, which resists compression and bending when cutting the soft elastomeric sheet but which is compressed and/or bent when pushed against the harder plastic backing sheet under the pressure required to cut through the elastomeric sheet. Such a cutting edge, further, does not scratch or otherwise mar a hard surface, and resists blunting or chipping of its cutting edge when striking a hard surface.

The plastic forming the die must be sufficiently stiff and hard to cut through a soft rubber stencil sheet without deforming, but not so hard or stiff as to readily cut through a harder-than-soft rubber plastic film backing sheet for the rubber. The plastic must be sufficiently strong in flexure to resist deformation and cracking when the load is applied to push the cutting edge of the die through the soft rubber. The plastic must also have sufficient impact strength not to crack when it strikes against a hard support for the stencil material being cut, after the die has passed through and cut the stencil material.

Further, such a polymeric plastic or hard rubber die is not as readily worn or chipped as a metal die; when it strikes sharply on a hard surface, it may deform and be compressed at the cutting edge, but if it deforms, it is sufficiently resilient to regain its original shape as soon as the pressure is released.

The term plastic does not include elastomers, but only those organic polymers which are rigid solids in their finished states but which during same stage in its manufacture or processing can be shaped into finished articles by flow or by in situ polymerization or curing.

The hard rubber, which can also be used, is a rubber vulcanized with a high proportion of sulfur or organic nonsulfur vulcanizing agent. This hard rubber, generally known as ebonite, is not an elastomer, as are the softer rubbers. Its properties resemble closely those of the plastics rather than those of the elastomers.

Therefore the physical properties of, and therefore the plastic used in forming, the die are determined by the stencil material to be cut and the backing material, which is not to be cut.

The type of design to be cut is also significant. A highly complex design, where there are a large number of lines to be cut per unit area, i.e. where the lines are close together, requires a plastic that is generally stronger. In this situation, greater pressure must be exerted on the die for it to make all of the necessary cuts and each cutting edge should be thinner, to assure sharpness of image where the lines to be cut away are very close together. This requires a plastic having a higher impact strength and flexural strength.

For example, if the stencil mask is a soft, uncured or only slightly cured rubber, and the die is to be only a single relatively simple printed letter, the die can even be formed of a material such as hard rubber, which can cut the soft rubber, but which is not as likely to cut a hard backing sheet such as a polyester film. Therefore, the Rockwell hardness, as well as the impact resistance and flexural strength, can vary widely depending upon the stencil to be cut. This ability to tailor the properties of the die cutting edge to the materials to be cut, by selecting a plastic having the desired structural strength characteristics is another advantage of forming dies of plastic.

The die should be formed of a plastic able to elastically deform under compression, so that after the cutting edge passes through soft rubber sheet, and presses against the harder plastic backing, which rests directly on the hard support surface, the die cutting edge compresses, or flattens out, under the compressive load rather than cuts through the plastic film. The edge should be compressed or flattened only to within its elastic limit so that it regains its sharp edge when the pressure is relaxed.

The flexural strength must also be great enough to prevent cracking or deformation of the die under load. Specifically, if the cutting load is applied in the center of the die, the die must be sufficiently rigid so that a substantially uniform cutting pressure is exerted over the entire cutting edge without the die being deformed and the resulting indicia made imperfectly. The center part of the die should not be pushed downward so that a cut is made through the mask only in the center and the outer portions are only incompletely cut.

A large die, for cutting an extensive design must be pressed at several points and the plastic must be able to resist the bending torque thus produced. The force at each point of contact can reach 8000 p.s.i.

To further prevent undesired deformation of the die, a rigid backing plate can be attached to the die, covering the entire top surface of the die to insure that uniform pressure is exerted over the entire cutting surface.

As can be seen from the above, the stiff, resilient plastic or hard elastomeric materials useful for the die of the invention can have a wide range of physical properties depending upon the materials to be cut. It has been found, however, that materials which are sufficiently hard and rigid to cut most stencil mask materials but which have sufficient resilience to avoid permanent deformation when striking a hard surface and do not as readily cut all backing sheet materials or scratch stone surfaces have the following properties: Rockwell hardness of at least about R50 and preferably at least about R90 (generally, plastics harder than about M130 are not available or not readily formed into the desired dies); an Izod Notch test impact strength of at least about 0.2 pound per inch notch and preferably at least about 0.25 pound per inch notch and a flexural strength of at least about 7500 pounds per square inch, and preferably of at least about 8000 pounds per square inch. Plastics having a flexural strength of up to 16,500 pounds per square inch are generally most readily available. Such plastics can elastically deform when pressed against a hard plastic backing sheet on the stencil, instead of readily slicing through the sheet, as would a metal die.

The Rockwell hardness is determined as set forth in ASTM D–785, the impact strength is determined by the Izod Notch test, as defined in ASTM D–256, and the flexural strength determined by ASTM D–790.

The cutting edge of the die of this invention is formed generally by a ridge on the face of the die having tapered sides. The apex of the ridge forms the cutting edge and the angle subtended by the sides of the ridge can be from about 5° to about 20° and preferably from about 7° to about 15°. Generally a smaller angle cuts a finer line and requires a stronger plastic to form the cutting edge.

This invention also provides an improvment in the process of cutting a sandblasting stencil mask with a die and more particularly for cutting the stencil mask ply of a two-ply stencil, such as is disclosed in Canadian Patent No. 757,807, without cutting the backing sheet, which comprises cutting with a die having a cutting edge formed from a stiff, resilient, organic polymeric nonelastomeric plastic, which includes so-called hard rubber, as defined above, which resists compression and bending when cutting the soft elastomeric stencil sheet but which can compress and/or bend when pressed against the harder nonelastomeric plastic backing sheet under the pressure required to cut through a soft elastomeric sheet.

Examples of a preferred embodiment of the invention are illustrated in the accompanying drawings in which:

FIGURE 1 is a perspective view of a stencil cutting die according to the invention;

FIGURE 2 is a cross-section of the stencil cutting die taken along the line 2—2 of FIGURE 1;

FIGURE 3 is a plan view of a stencil cut by dies according to the process of the invention.

FIGURE 4 is a cross-section of the stencil taken along the line 4—4 of FIGURE 3;

FIGURE 5 is a view in perspective of apparatus for cutting the stencil shown in FIGURE 3 with dies as shown in FIGURE 1 of the drawings and FIGURE 6 is a cross-section taken along the line 6—6 of FIGURE 5.

A stencil cutting die 10 formed by injection molding of a polycarbonate resin, according to the invention is shown in detail in FIGURES 1 and 2 of the drawings. Die 10 consists of a mounting plate or base 11 having a back bearing face 12 and a front face 13 carrying parallel raised, tapered ridges 14 and 14a forming a raised letter, figure or pattern 15 in outline. The base 11 of the letters is dimensioned to provide the proper spacing between adjacent letters. The sides of raised, tapered ridges 14 and 14a converge at a narrow angle A as shown by the extension lines in FIGURE 2, to form sharp cutting edges 16 and 16a. The height of the ridges 14 and 14a should not be less than the thickness of the stencil to be cut, and the thickness of face 11 is sufficient to accommodate the force applied to the die without being distorted or cracking as determined by the flexural strength of the particular plastic.

The thickness of the ridges 14 or 14a is determined by the spacing of the lines to be cut; the minimum width, or the minimum angle A, is limited by the flexural yield strength of the plastic and by the force to which it will be subjected in cutting the stencil.

In the typical die according to the invention shown in FIGURES 1 and 2, the height of ridges 14 and 14a is 0.08 inch, the angle subtended by the sides are 10°, and the thickness of base 11 is 0.17 inch, making a total thickness of 0.25 inch. Dimensional tolerances are in the range of plus or minus 0.001 inch.

Although preferably this invention encompasses the all-plastic stencil cutting die shown in FIGURES 1 and 2, it also encompasses a composite die where a plastic die cutting edge is attached to a harder, more rigid support backing. The backing serves to limit distortion when pressure is applied. In this case, the thickness of the plastic die is not important. The force applied against the rigid support backing is uniformly distributed over the entire cutting surface of the die.

The cutting ridges 14 and 14a are the only portions that need be plastic to obtain the advantages of this invention with regard to selectively cutting the stencil mask without cutting a backing sheet or without marring a hard surface. The die cutting edge can even be formed as continuous, or discontinuous, strips on a surface of another material, such as wood, metal, ceramic or another harder plastic. The plastic ridges such as 14 and 14a in FIGURE 1, can be extruded in long strips, bent, at elevated temperatures into the desired shape and bonded to the die plate. The ridges can also be molded in the desired shape and attached to the die.

Many of the advantages of a plastic die are also obtained from a laminated die comprising a metal or wooden substrate coated or sheathed with a polymeric, shape-retaining plastic or hard polymer. The substrate has the desired die shape and the plastic coating or sheathing, e.g. 0.01 inch thick, on the cutting edge provides a cutting edge which can be made soft enough not to readily cut the backing sheet of a two-ply stencil, and not to mar a stone surface against which it is struck, and resilient enough to resist blunting.

Materials which are especially useful in forming a plastic stencil-cutting die according to the present invention are as follows:

Transparent, or translucent materials include acetal polymers such as polyformaldehyde or polyoxymethylene, acrylic polymers, such as poly(methyl methacrylate) and poly(methyl acrylate) homopolymers, and copolymers with styrene and alpha-methyl styrene, cast allyl polymers, cellulose acetate, cellulose propionate, cellulose acetate-butyrate, poly(chlorotrifluoroethylene), 6/6 nylon, phenol-formaldehyde and phenol-furfural resins, polyester, phenolic cast resins, phenoxy resins, polycarbonate resins, polypropylene, polysulfones, polystyrene, styrene-acrylonitrile copolymers, polyvinyl chloride and polyvinylidene chloride.

If transparency is not required for a given purpose, many of the above resins can be strengthened by adding fillers such as glass fibers, asbestos and mineral filler. Other opaque resins that can also be used include filled or unfilled epoxy resins, high impact polystyrene and hardened natural and synthetic hard rubers, i.e. ebonites, such as from ABS rubber and GR–S rubber.

A particularly suitable material for use in forming a stencil cutting die in accordance with the present invention is polycarbonate resin, e.g. Lexan, having a Rockwell hardness of M78, an impact strength of 14 foot-pounds per inch notch, and a flexural strength of 13,500 pounds per square inch. Another suitable material is a styrene-acrylonitrile copolymer, Tyril 780, having a Rockwell hardness of R110, an impact strength of 0.25 foot-pound per inch of notch and a flexural strength of 16,500 pounds per square inch. Another group of particularly suitable materials are the acrylic plastics such as Plexiglas V, VM or VS which have a Rockwell hardness of between M80 and M97, an impact strength of 0.25 foot-pound per inch, and a flexural strength of between 14,000 and 16,000 pounds per square inch, and Lucite 129, 130 or 140 which have a Rockwell hardness of between M88 and M103, an impact strength of 0.3 foot-pound per inch, and a flexural strength of between 15,000 and 16,000 pounds per square inch.

An important advantage to be gained by using the transparent materials is that they permit viewing the letters or design on the die through the rear surface when it is set on the surface to be cut. The design is then seen as it will appear cut into the stencil, rather than as the mirror image of the design which would appear to the viewer looking at the die from its cutting surface and permits checking alignment of the design on the stencil. For example, when viewing the die 10 of FIGURE 1 through the rear face 12 of base 11, the letter "D" can be viewed in its normal configuration, and not as a mirror image of itself, which it would be if it were viewed from its cutting surface 13; this permits a much easier assembling of the die than would be possible when using opaque dies, for example, those formed of metal. Furthermore, a transparent die appears to darken when the stencil is cut all the way through and the face of the die presses against the sheet.

All plastic materials, even those that are not transparent, are more efficient than dies of a metal material because of the ease with which these materials can be colored and formed to the desired shape. For instance, it is possible to color-code the dies, in accordance with the type face of the die, i.e., the size and style of the lettering. This permits easy sorting of the dies even by relatively inexperienced help who would not have to be trained to know the particular types of lettering which should be used in setting up the die plate. It would only be necessary to instruct them to use letters of a particular color. The color would be permanent, as it would be incorporated into the resin materials from which the die is formed.

The dies can be formed by injection molding or compression molding, when using thermoplastic resins or by casting when using thermosetting resins. The filled resin materials can also be formed by compression molding. Even filled resins having a fabric substrate can be formed by compression molding. These methods of manufacture, especially injection molding with thermosplastic resins, are much faster and less expensive means of manufacture than engraving or casting metal dies.

FIGURES 3 and 4 of the drawings illustrate a sencil cut with dies according to the process of the present invention. The stencil comprises a laminated mask 20 having a sheet 21 with a backing 22 adhering thereto. Sheet 21 is composed of a soft, elastomeric or rubbery material having a hardness of about 60 on the Shore Durometer A test scale. This material is capable of being cut by a die but resistant to erosion by sandblasting. It is sold by Anchor Continental of Columbia, S.C., U.S.A. under the name "Continental Sand Blast Stencil." Generally, suitable materials for such stencil sheets are formed of uncured or partially cured natural or synthetic rubbers. These materials have a hardness rating on the Shore Durometer A scale which is the softest of the hardness rating scales. Generally, these materials will have a hardness rating below about 80 (Shore A) (ASTMD-676) and preferably in the range from about 40 to 70 (Shore A).

Backing 22 is preferably a tape material having one surface 23 coated with a pressure-sensitive adhesive and the other surface 24 adhered to sheet 21 by a further coating of pressure sensitive adhesive. Backing 22 should be readily destructible by sandblasting but should be difficult to cut or tear. A suitable sheet material for backing 22 is polyester sheet such as "Mylar." Other useful materials include nylon film and regenerated cellulose.

A protective covering 25 is adhered to surface 23 of backing 22 and is peeled off when mask 20 is applied to a hard surface to be inscribed. The suitable, flexible plastic backing materials have a hardness which is measurable on the Shore D scale (ASTM D-1484) which is a magnitude greater than the Shore A scale. Preferably these materials have a Shore D hardness of at least about 75.

An example of a stencil cutting apparatus for use with the dies of the present invention to produce a stencil such as that shown in FIGURE 3 of the drawings is illustrated in FIGURES 5 and 6 of the drawings. This apparatus consists of a base 30 having a travelling gantry 31 on which is mounted a mechanical press means 32 having a downwardly projecting head 33. The body to be inscribed, such as a stone 34, is placed on base 30 with its upper surface 35, to be inscribed by sandblasting, covered by stencil mask 20. Individual stencilling dies 10 are placed on mask 20 and held together as a group by an adjustable frame 36. A press block 37 is positioned over the dies 10 to transfer pressure from head 33 of press means 32 to the dies. The force applied to the dies is usually a minimum of 750 pounds per square inch. The wear on cutting edges 16 of dies 10 can be further reduced by making the depth of the cutting flanges 14 on the die 10 equal to the thickness of sheet 21 and the thickness of base 11 equal to the thickness of frame 36, as shown more particularly in FIGURE 6 of the drawings.

The advantage of using the transparent plastic dies is readily seen from FIGURE 5; the word spelled out by the dies, "DONALD," is readily seen in its proper position, through the backs of the dies. The worker setting the dies can thus check the alignment and accuracy of the die set up when it is completed and in place over the stencil to be cut. Furthermore, the transparent die permits the operator to visually determine when the stencil has been completely cut through. He can see when the rubber is pressing against the underside of the die plate.

In carrying out the process of this invention with the apparatus of FIGURES 1, 2, 5 and 6, for cutting a two-ply stencil, such as that shown in FIGURES 3 and 4, the stencil mask 21 is preferably a soft, partially cured rubber such as Continental Sand Blast stencil, the backing 22 is a hard polyester, such as Mylar and the die is formed of an acrylic resin such as Plexiglas. The acrylic resin is sufficiently hard to cut through the soft rubber stencil mask 21, but is not hard enough to readily cut through the polyester material with the same amount of pressure applied. A pressure of 6,000 p.s.i. is applied by the piston 33.

Having regard to the foregoing disclosure, the following is claimed as the inventive and patentable embodiments thereof:

1. A stencil cutting die for a two-ply stencil comprising a soft, elastomeric top sheet and a harder flexible non-elastomeric plastic backing sheet, the die comprising a base having a raised pattern on one face thereof, the raised pattern having a cutting edge, the cutting edge being formed from a stiff, resilient organic, polymeric, nonelastomeric plastic which is sufficiently hard, and stiff to cut through a semi-cured elastomeric rubbery stencil having a hardness rating of at least 40 on the Shore A scale and which resists permanent substantial deformation by compression and bending when cutting the soft elastomeric sheet but which can elastically compress and/or bend when pressed against the harder nonelastomeric plastic backing sheet under the pressure required to cut through a soft elastomeric sheet.

2. A stencil cutting die for cutting through soft, abrasion-resistant stencil sheet material formed from a hard, resilient organic, polymeric, nonelastomeric plastic which is sufficiently hard and stiff to cut through a semi-cured elastomeric rubbery stencil having a hardness rating of at least 40 on the Shore A scale and which resists permanent substantial deformation by compression and bending when cutting the soft elastomeric sheet but which can elastically compress and/or bend when pressed against the harder nonelastomeric plastic backing sheet under the pressure required to cut through a soft elastomeric sheet.

3. A die as claimed in claim 2 in which the plastic has a Rockwell hardness of at least about R50 and an impact strength of at least about 0.2 foot-pound per inch notch and a flexural strength of at least about 7500 p.s.i.

4. A die as claimed in claim 3 wherein the hardness is in the range of from about R90 to about M130, the impact strength is at least about 0.25 foot-pound per inch notch and the flexural strength is from about 8,000 to about 16,500 p.s.i.

5. A die as claimed in claim 2 in which the plastic material is styrene-acrylonitrile copolymer.

6. A die as claimed in claim 2 in which the plastic material is a polycarbonate.

7. A die as claimed in claim 2 in which the plastic material is a poly(methyl methacrylate).

References Cited
UNITED STATES PATENTS

| | | | |
|---|---|---|---|
| 1,084,313 | 1/1914 | Choate | 101—128.2 X |
| 2,917,998 | 12/1959 | Morgan | 101—128.2 X |
| 2,997,788 | 8/1961 | Gilbert | 30—123 |

JAMES M. MEISTER, Primary Examiner

U.S. Cl. X.R.

83—6, 684, 701; 101—128.2